(12) United States Patent
Ni

(10) Patent No.: US 6,928,055 B2
(45) Date of Patent: Aug. 9, 2005

(54) NETWORK INTERFACE UNIT

(75) Inventor: Jie Ni, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 3 days.

(21) Appl. No.: 10/635,750

(22) Filed: Aug. 5, 2003

(65) Prior Publication Data

US 2004/0037225 A1 Feb. 26, 2004

Related U.S. Application Data

(63) Continuation of application No. 09/105,395, filed on Jun. 26, 1998, now Pat. No. 6,680,910.

(51) Int. Cl.[7] .............................................. H04L 12/26
(52) U.S. Cl. ...................................... 370/235; 370/253
(58) Field of Search ................................. 370/235, 253

(56) References Cited

U.S. PATENT DOCUMENTS 5,367,523 A * 11/1994 Chang et al. ............... 370/235
5,959,973 A * 9/1999 Meurisse et al. ........... 370/232
2004/0085903 A1 * 5/2004 Matsumoto et al. ........ 370/235

* cited by examiner

Primary Examiner—Melvin Marcelo
(74) Attorney, Agent, or Firm—Glen B. Choi

(57) ABSTRACT

Briefly, in accordance with one embodiment of the invention, a system includes: a network interface unit (NIU). The network interface unit (NIU) is adapted to monitor bandwidth utilization of the netrwork interface unit and adjust the minimum interval for the transmission of a flow control packet, based, at least in part, on the bandwidth utilization determination.

Briefly, in accordance with another embodiment of the invention, an apparatus includes at least one integrated circuit. The integrated circuit includes the capability, either alone or in combination with other integrated circuits, to monitor the receive rate utilization of a network interface unit and adjust the minimum interval for the transmission of a flow control frame, based, at least in part, on the receive rate utilization determined.

29 Claims, 3 Drawing Sheets

NETWORK INTERFACE UNIT

RELATED APPLICATION

This is a continuation of U.S. patent application Ser. No. 09/105,395, filed on Jun. 26, 1998, now U.S. Pat. No. 6,680,910.

BACKGROUND

1. Field

The present invention relates to network interface units, and more particularly, to network interface units that employ flow control.

2. Background Information

As is well known, when a port of a network interface unit (NIU) is configured to operate in full-duplex mode, congestion may result due to a shortage of internal resources, such as, for example, due to the filling of buffers that receive packets of information signals. Because, typically, limited memory is available for buffering these data signals, and limited memory is available for forwarding these signals as well, flow control signaling may be employed. See, for example, the CSMA/CD Access Method Standards Package, available from the Institute of Electrical and Electronics Engineers, Inc. (IEEE), New York, N.Y., which includes the IEEE standard 802.3u-1995. Typically, the congestion problem is alleviated by sending flow control frames in a full-duplex network configuration, or alternatively, by applying back pressure in a half-duplex network configuration. This flow control frame is employed to reduce the risk that the other side of the network does not transmit a frame to an already congested switch or other device. However, because this flow control frame is sent across the sent across the network, it may result in additional traffic and even collision. Therefore, employing flow control may decrease congestion, but it may also degrade performance. A need, therefore, exists for a method or technique for addressing the congestion of a network interface unit (NIU), while reducing the degradation in performance of the network.

Briefly, in accordance with one embodiment of the invention, a system includes: a network interface unit (NIU). The network interface unit (NIU) is adapted to monitor bandwidth utilization of the network interface unit and adjust the minimum interval for the transmission of a flow control packet, based, at least in part, on the bandwidth utilization determination.

Briefly, in accordance with another embodiment of the invention, an apparatus includes at least one integrated circuit. The integrated circuit includes the capability, either alone or in combination with other integrated circuits, to monitor the receive rate utilization of a network interface unit and adjust the minimum interval for the transmission of a flow control frame, based, at least in part, on the receive rate utilization determined.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Figure 1:
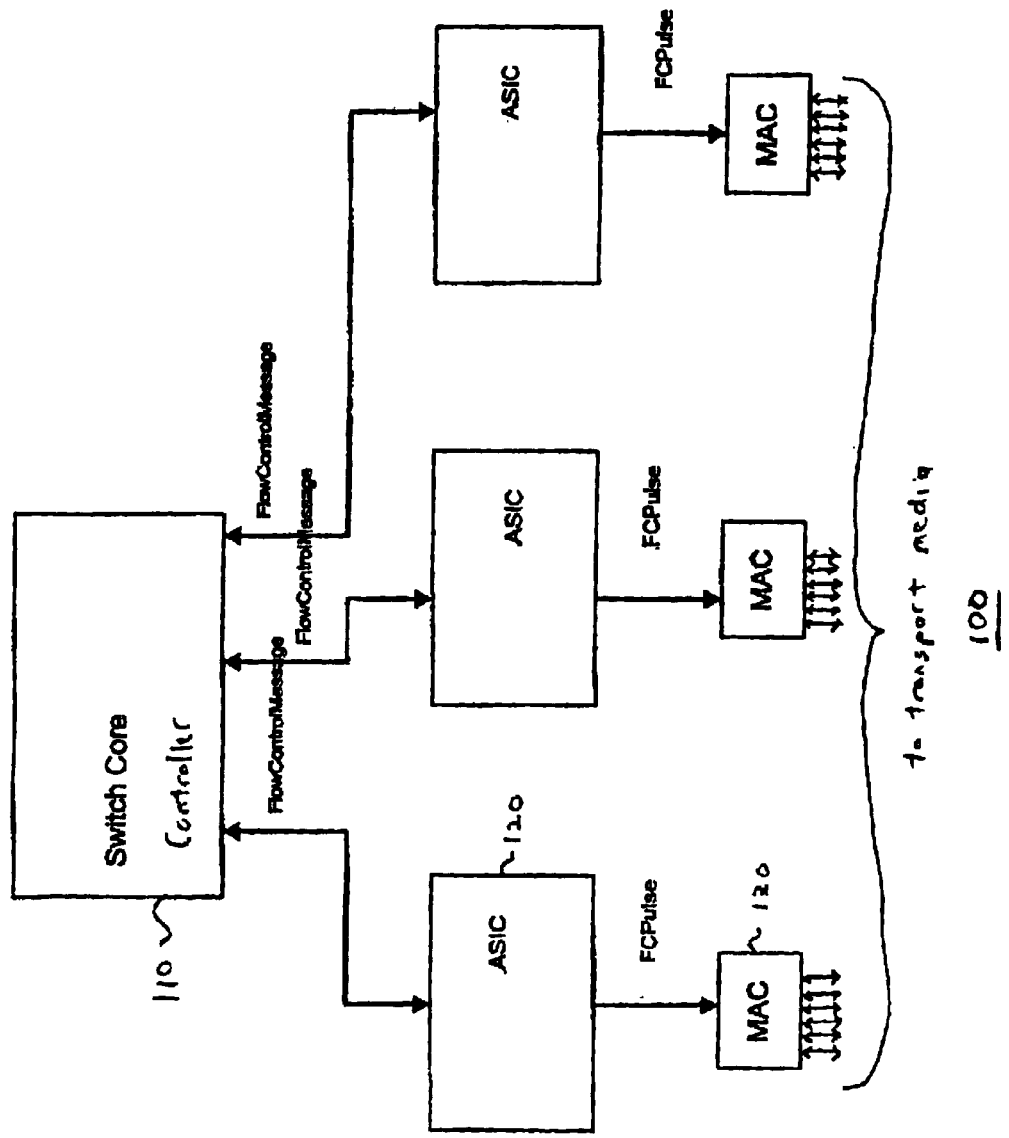
FIG. 1 is a block diagram illustrating an embodiment of a network interface unit (NIU) in accordance with the present invention.

FIG. 1 is a block diagram illustrating an embodiment of a network interface unit (NIU) in accordance with the present invention. As illustrated in this particular embodiment, embodiment 100 includes a processing unit 110 which in this particular embodiment comprises a switch core controller, an application specific integrated circuit (ASIC) 120, employed in this particular embodiment to implement flow control, as shall be discussed in more detail hereinafter, and media access controllers (MACs) 130. As illustrated, respective media access controllers 130 couple to respective ports. It will, of course, be appreciated that the invention is not limited in scope to this particular embodiment. As shall be discussed in more detail hereinafter, there are a variety of possible embodiments and architectures that might be employed to implement the invention.

This particular embodiment of a network interface unit is adapted to monitor the bandwidth utilization or receiving rate of a receiving link and adjust the minimum interval for the transmission of a flow control packet, based, at least in part, on the bandwidth utilization or receiving rate determined. Specifically, in this particular embodiment, processing unit 110 performs monitoring of the receiving rate or bandwidth utilization, whereas flow control ASICs 120 implement the adjustment of the minimum interval for the transmission of a flow control packet, to thereby control the flow of packets. Likewise, in this embodiment, media access controllers (MACs) 130 form the flow control packet and transmit the packets over the network. Of course, the invention is not limited in scope in this respect. For example, these operations may be performed in alternative portions of the network interface unit in other embodiments in accordance with the invention. The monitoring may alternatively be performed in ASIC 120 or media access controller 130, for example, and, likewise, the adjustment of the minimum interval may alternatively be performed in processing unit 110, although, of course, then ASICs 120 would not perform flow control. Furthermore, the separate integrated circuits (ICs) illustrated, in an alternative embodiment, may be combined into a single integrated circuit or a subset of the ICs may be combined into a single IC. Therefore, any one of a number of possible arrangements may be employed in alternative embodiments of the invention and provide satisfactory performance.

Figure 2:
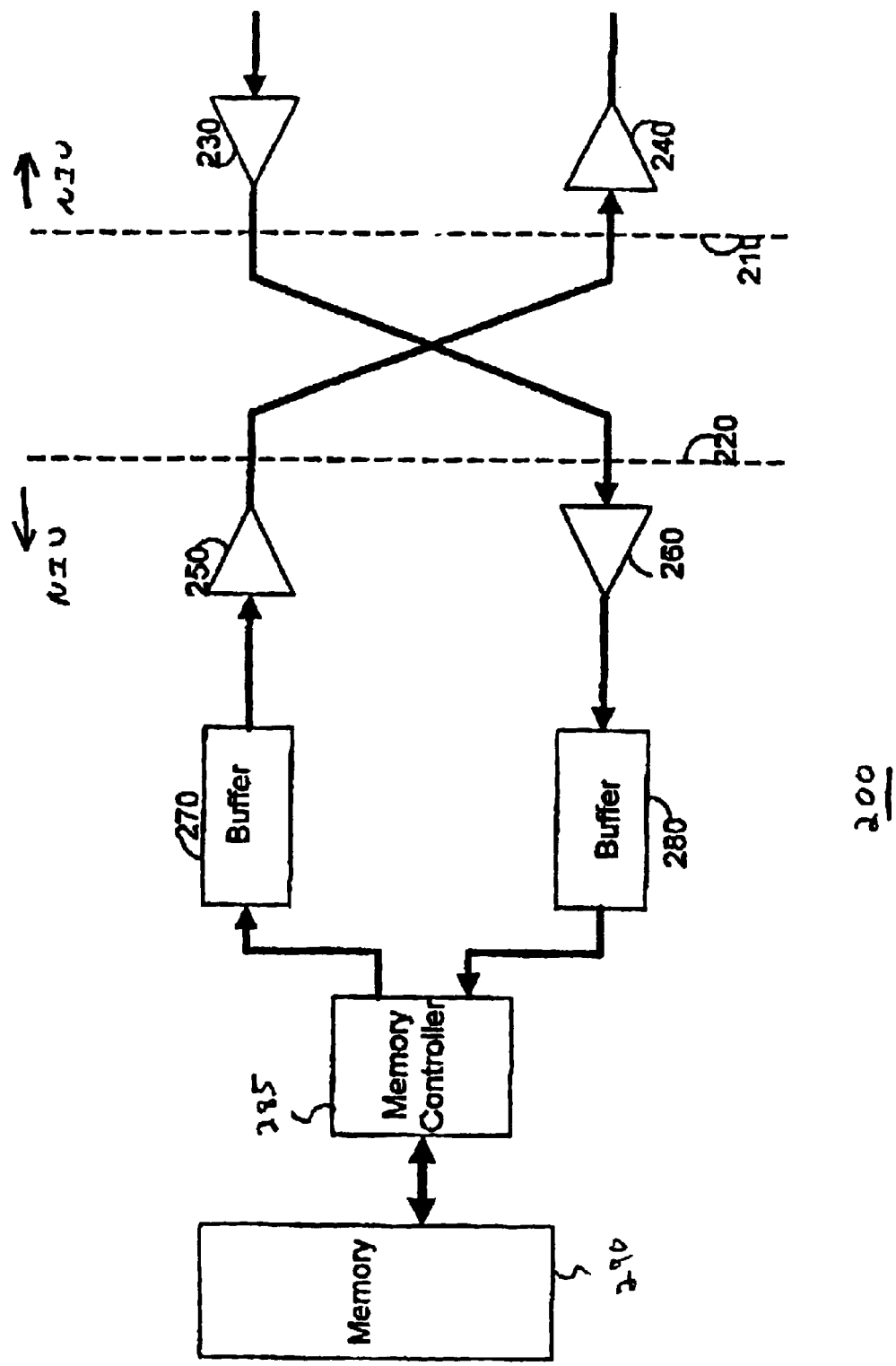
FIG. 2 is a schematic diagram illustrating a portion of a network that may employ the embodiment of FIG. 1.

FIG. 2 is a schematic diagram illustrating a portion of a network that may employ an embodiment in accordance with the invention. The portion illustrated shows two network interface units (NIUs). Likewise, as illustrated in FIG. 2, these NIUs are coupled via network couplings. In this embodiment of a portion of a network, these network interface units include a switch with ports that are configured to operate in full-duplex mode. Thus, although the invention is not limited in scope in this respect, network interface unit 220 includes transmitter 250 and receiver 260. Transmitter 250 is coupled to a buffer 270 and receiver 260 is coupled to a buffer 280. Likewise, these buffers communicate with shared memory 290, as is conventionally done, for example, in switches that employ a shared memory architecture. The use of a shared memory architecture in a switch and/or router is well-known. Shared memories are described, for example, in *Computer Networks*, by Andrew S. Tanenbaum, published by Prentice-Hall, Inc., Upper Saddle River, N.J., 3d Edition, 1996. Due to the general resource limitations of network interface unit 220, with buffer 280 coupled to receiver 260, buffer 280 might easily reach its capacity. Therefore, due to this limited memory for buffering data signals and, likewise, limited memory for forwarding entries, depending upon the memory bandwidth of shared memory 290, for example, it may be desirable to control the flow of packets across the network, such as from network interface unit 210, so that signal packets transmitted via the network are not "dropped" by unit 220.

Typically, in a full-duplex network configuration, for example, this congestion problem is addressed by employing flow control frames. See, for example, the IEEE standard 802.3u, previously cited. The flow control frames are transmitted at a regular time interval that is typically either designed in hardware or in software. This regular time interval is referred to in this context as the minimum interval. This flow control packet is transmitted across the network to reduce the risk that a frame is not transmitted to an already congested switch. For example, if the minimum interval is a second, a flow control packet is transmitted every second to notify interface unit 210 whether or not to continue transmitting packets. One disadvantage of this approach, however, is that it may result in additional traffic and also may result in packet collision. Therefore, although employing this flow control frame may address congestion, it also may reduce or degrade overall network performance.

Alternatively, if it were known or could be determined that the bandwidth capacity of the network, or perhaps, a portion of the network, were not being utilized fully or completely, then this degradation in performance could be reduced by transmitting a flow control packet less frequently. This might be desirable in some instances because, with bandwidth utilization being less than 100%, the risk of dropping a packet is reduced. Therefore, the flow control packets may be sent or transmitted less frequently without significantly increasing the risk of transmitting a packet to a switch that is already congested.

In one embodiment of a network interface unit in accordance with the present invention, the bandwidth utilization of the network interface unit may be monitored by counting the number of packets received, such as at a port, for example, over a predetermined time period. As previously indicated, for the embodiment illustrated in FIG. 1, this operation is performed by processing unit 110, although the invention is not limited in scope in this respect. After processing unit 110 has monitored the number of packets received over a predetermined time period, a determination may be made regarding utilization of bandwidth in the network or a portion of the network.

Figure 3:
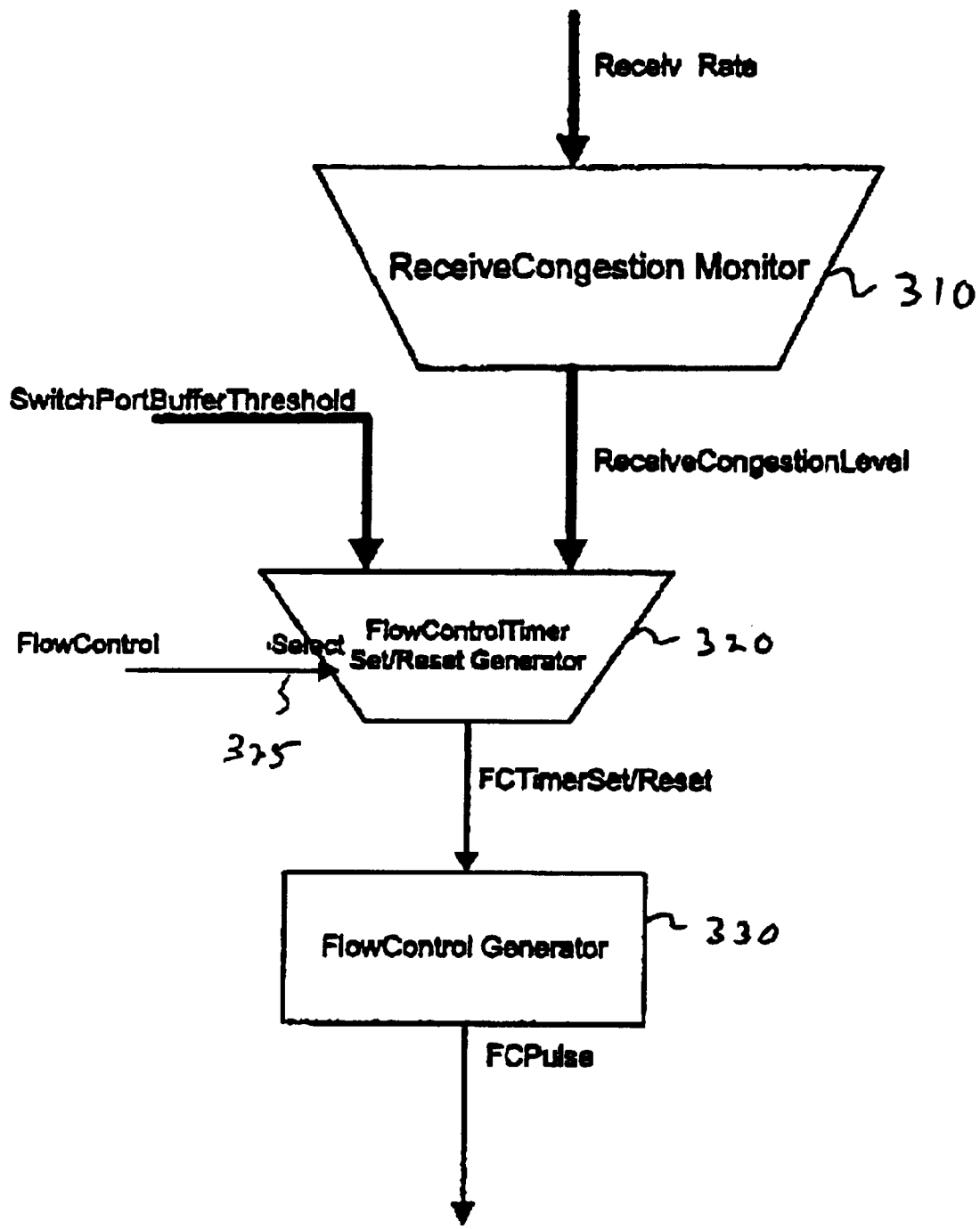
FIG. 3 is a schematic diagram illustrating the operations performed by the components of the embodiment of FIG. 1.

In this particular embodiment, the network interface unit begins with the smallest minimum interval for the flow control frame, employing a "worst case" scenario. Of course, the invention is not limited in scope in this respect. Thus, here, when processing unit 110 determines that utilization is less than 100%, the minimum interval may be increased, which will result in the transmission of a flow control frame less frequently. For example, referring to FIG. 3, which is a schematic diagram illustrating the operations performed by the components of FIG. 1, a receive congestion monitor 310 monitors the receive rate at a port, for example. This operation in this embodiment is performed by switch core controller 110 in this particular embodiment, as previously described, although the invention is not limited in scope in this respect. From this, a receive congestion level is determined and this level is transmitted, in this embodiment, to ASIC 120. As FIG. 1 illustrates, this is transmitted, in this embodiment, using a flow control message signal. In this embodiment, ASIC 120 performs the operation of determining when to set/reset the flow control timer, indicated in FIG. 3 as flow control timer set/reset generator 320. Therefore, this generator, as illustrated in FIG. 3, in this particular embodiment, includes a threshold level, referred to for this embodiment as the switch port buffer threshold. In one embodiment, although the invention is not limited in scope in this respect, when the switch port buffer threshold is exceeded, an increase in the minimum interval may occur linearly. For example, if 80% utilization is detected, than the flow control frame minimum interval may increase by 20%. In an alternative embodiment, a technique may be employed where the minimum interval is adjusted exponentially, rather than linearly. Furthermore, in some embodiments, as illustrated in FIG. 3, by flow control select 325, the NIU may include the capability to implement a variety of minimum interval adjustment techniques, and the particular technique to be employed may be selected through hardware and/or software programming. Likewise, in yet another embodiment, the selection of the particular technique to be employed may depend, at least in part, on the result of the receive rate or bandwidth utilization determination. For example, although the invention is not restricted in scope in this respect, if the measured or determined receive rate exceeds a predetermined threshold, the minimum interval may be adjusted exponentially, instead of linearly; however, if the receive rate does not exceed the threshold then the minimum interval, in this example, is adjusted linearly.

As previously indicated, this adjustment of the minimum interval is accomplished in ASICs 120, although the invention is not limited in scope in this respect. Referring to FIG. 3, generator 320 determines, in this embodiment, based, at least in part, on the receive congestion level, previously described, to change the minimum internal. Therefore, a flow control timer set/reset signal may be transmitted to flow control generator 310. Flow control generator 330 then transmits a flow control pulse. In FIG. 1, this is illustrated as transmitted form ASIC 120 to MAC 130, although, again, the invention is not limited in scope in this respect. In this embodiment, this pulse signals to MAC 130, which in this embodiment, forms and transmitted the flow control packet over the network couplings, how frequently to form and transmit the flow control frame.

In another embodiment, the minimum interval may initially comprise the greatest minimum interval and, based on a utilization determination, decrease, such as for example, linearly or exponentially. Likewise, the minimum interval may initially comprise a level so that depending on bandwidth utilization or receive rate, it may increase or decrease. Many different approaches are possible.

It will, of course, be appreciated that any one of a number of techniques may be employed to monitor bandwidth utilization or receive rate and, likewise, any one of a number of techniques may be employed to adjust the minimum interval for the flow control frame.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A system comprising:
a network interface unit;
said network interface unit to monitor the bandwidth utilization of said network interface unit and adjust, at the network interface unit, the minimum interval for the transmission of a flow control frame, based, at least in part, on the bandwidth utilization monitored.

2. The system of claim 1, wherein said network interface unit is to monitor utilization by counting the number of signal packets received over a predetermined time period.

3. The system of claim 1, wherein said network interface unit is to monitor utilization at a particular port by counting the number of signal packets received over a predetermined time period at that port.

4. The system of claim 1, wherein said network interface unit is to adjust the minimum interval by increasing the minimum interval linearly as the utilization decreases.

5. The system of claim 4, wherein said network interface unit is to adjust the minimum interval at a particular port by increasing the minimum interval linearly as the utilization decreases at that port.

6. The system of claim 1, wherein said network interface unit is to adjust the minimum interval by increasing the minimum interval exponentially as the utilization decreases.

7. The system of claim 6, wherein said network interface unit is to adjust the minimum interval at a particular port by increasing the minimum interval exponentially as the utilization decreases at that port.

8. The system of claim 1, wherein said network interface unit is to adjust the minimum interval by decreasing the minimum interval linearly as the utilization increases.

9. The system of claim 8, wherein said network interface unit is to adjust the minimum interval at a particular port by decreasing the minimum interval linearly as the utilization increases at that particular port.

10. The system of claim 1, wherein said network interface unit is to adjust the minimum interval by decreasing the minimum interval exponentially as the utilization increases.

11. The system of claim 10, wherein said network interface unit is to adjust the minimum interval at a particular port by decreasing the minimum interval exponentially as the utilization increases at that particular port.

12. The system of claim 1, wherein said network interface unit is to change the relationship employed to adjust the minimum interval based, at least in part, on the utilization monitored.

13. The system of claim 12, wherein the network interface unit is to decrease in the minimum interval linearly if the utilization monitored is below a predetermined threshold and decrease the minimum interval exponentially if the utilization is above the predetermined threshold.

14. The system of claim 12, wherein the network interface unit is to increase the minimum interval exponentially if the utilization is below a predetermined threshold and increase the minimum interval linearly if the utilization is above a predetermined threshold.

15. A method of transmitting flow control frames from a network interface unit comprising:
at the network interface unit, monitoring the receive rate of signal packets for the network interface unit; and
adjusting, at the network interface unit, the minimum interval for the transmission of the flow control frames, based, at least in part, on the receive rate monitored.

16. The method of claim 15, wherein the receive rate is monitored at least at a particular port of the network interface unit.

17. The method of claim 15, wherein monitoring the receive rate comprises:
counting the number of signal packets received over a predetermined time period.

18. The method of claim 17, wherein counting comprises counting the number of signal packets received over a predetermined time period at a particular port.

19. An apparatus comprising: a network interface comprising at least one integrated circuit;
said integrated circuit, either alone or in combination with other integrated circuits, to monitor, at the network interface unit, the receive rate utilization of a network interface unit and adjust, at the network interface unit, the minimum interval for the transmission of a flow control frame, based, at least in part, on the receive rate utilization monitored.

20. The apparatus of claim 19, wherein the integrated circuit is to monitor the receive rate utilization of the network interface unit and adjust the minimum interval only in combination with other integrated circuits.

21. The apparatus of claim 19, wherein the integrated circuit is to monitor the receive rate utilization of a network interface unit alone.

22. The apparatus of claim 21, wherein the integrated circuit is to adjust the minimum interval alone.

23. A system comprising:
a memory device to store and provide packets;
a network medium interface to intercommunicate with a network medium;
a transmit buffer to store packets to be transmitted to the network medium;
a receive buffer to store packets received from the network medium;
a transmitter to transmit packets to the network medium;
a receiver to receive packets from the network medium; and
a flow control device to monitor bandwidth utilization and adjust a minimum interval for transmission of a flow control frame, based, at least in part, on the bandwidth utilization determined.

24. The system of claim 23, wherein the flow control device selects whether to apply a linear or non-linear adjustment to the minimum interval based, at least, on an interval selection signal.

25. The system of claim 23, wherein the flow control device selects whether to apply an adjustment to the minimum interval based, at least, on a comparison between a utilization threshold and the bandwidth utilization.

26. The system of claim 23, wherein the flow control device is configured to adjust the minimum interval by increasing the minimum interval linearly as the utilization decreases.

27. The system of claim 23, wherein the flow control device adjusts the minimum interval by increasing the minimum interval exponentially as the utilization decreases.

28. The system of claim 23, wherein the flow control device adjusts the minimum interval by decreasing the minimum interval exponentially as the utilization increases.

29. The system of claim 23, wherein the flow control device is configured to monitor bandwidth utilization by counting a number of signal packets received over a predetermined time period.

* * * * *

UNITED STATES PATENT AND TRADEMARK OFFICE
CERTIFICATE OF CORRECTION

PATENT NO. : 6,928,055 B2  Page 1 of 1
DATED : August 9, 2005
INVENTOR(S) : Ni

It is certified that error appears in the above-identified patent and that said Letters Patent is hereby corrected as shown below:

<u>Title page,</u>
Item [57], ABSTRACT,
Line 4, delete "netrwork" and insert -- network --.

Signed and Sealed this

Eighteenth Day of October, 2005

JON W. DUDAS
*Director of the United States Patent and Trademark Office*